United States Patent
Spaulding et al.

(10) Patent No.: US 10,167,145 B2
(45) Date of Patent: Jan. 1, 2019

(54) PICK OR PUT STATION WITH CONTROLLABLE RECEPTACLE EXCHANGE

(71) Applicant: Dematic Corp., Grand Rapids, MI (US)

(72) Inventors: David L. Spaulding, Ada, MI (US); Robert C. Sciog, Walker, MI (US)

(73) Assignee: Dematic Corp., Grand Rapids, MI (US)

( * ) Notice: Subject to any disclaimer, the term of this patent is extended or adjusted under 35 U.S.C. 154(b) by 122 days.

(21) Appl. No.: 15/383,489

(22) Filed: Dec. 19, 2016

(65) Prior Publication Data

US 2017/0174446 A1 Jun. 22, 2017

Related U.S. Application Data (60) Provisional application No. 62/270,636, filed on Dec. 22, 2015.

(51) Int. Cl.
| | |
|---|---|
| *B65G 1/06* | (2006.01) |
| *B65G 47/88* | (2006.01) |
| *B65G 1/137* | (2006.01) |

(52) U.S. Cl.
CPC ........... *B65G 47/8823* (2013.01); *B65G 1/06* (2013.01); *B65G 1/1378* (2013.01)

(58) Field of Classification Search
CPC .............. B65G 47/8823; B65G 1/1378; B65G 1/1376; B65G 47/962; B65G 47/967; B65B 67/02
See application file for complete search history.

(56) References Cited

U.S. PATENT DOCUMENTS

| | | |
|---|---|---|
| 3,095,982 A | 7/1963 | Weiser |
| 3,149,736 A | 9/1964 | Austin et al. |
| 4,909,697 A * | 3/1990 | Bernard, II .......... B65G 1/0485 187/255 |

(Continued)

FOREIGN PATENT DOCUMENTS

| | | |
|---|---|---|
| DE | 102012025163 A1 | 6/2014 |
| EP | 1012090 A1 | 6/2000 |

(Continued)

OTHER PUBLICATIONS

International Search Report and Written Opinion of the International Searching Authority from corresponding Patent Cooperation Treaty (PCT) Application No. PCT/IB2016/057798, indicated completed on Mar. 23, 2017.

(Continued)

*Primary Examiner* — Patrick H Mackey
(74) *Attorney, Agent, or Firm* — Gardner, Linn, Burkhart & Ondersma, LLP (57) ABSTRACT

A receptacle exchange for a pick or put receptacle and method for exchanging a pick or put receptacle includes a process location at which an operator processes a receptacle by picking articles from or putting articles to a receptacle. A lift moves a receptacle from a supply location to the process location. An extractor retrieves a receptacle from the process location to an extracted location. A first drive elevates the lift between the supply location and process location and moves the extractor between the process location and extracted location. A second drive moves an inclination of the extractor. A control controls the first and second drives.

22 Claims, 8 Drawing Sheets

(56) References Cited

U.S. PATENT DOCUMENTS

| | | | | |
|---|---|---|---|---|
| 6,134,862 | A | * | 10/2000 | Francois ................ B65G 65/23 254/8 R |
| 6,468,015 | B1 | * | 10/2002 | Konstant ................. B65G 1/08 193/35 MD |
| 7,234,913 | B2 | | 6/2007 | Heiland et al. |
| 7,809,467 | B2 | * | 10/2010 | Schaefer .............. B65G 1/1378 700/216 |
| 8,634,954 | B2 | | 1/2014 | Schafer |
| 8,713,899 | B2 | | 5/2014 | Hortig et al. |
| 9,004,846 | B2 | | 4/2015 | La Rovere et al. |
| 9,026,243 | B2 | | 5/2015 | Radwallner et al. |
| 9,580,248 | B2 | * | 2/2017 | Hasman ................ G06Q 10/087 |
| 2004/0139692 | A1 | * | 7/2004 | Jacobsen ................. B65B 57/12 53/55 |
| 2004/0253082 | A1 | * | 12/2004 | Mathys ................ B65G 1/1378 414/280 |
| 2011/0130869 | A1 | | 6/2011 | Linge et al. |

FOREIGN PATENT DOCUMENTS

| | | |
|---|---|---|
| EP | 1379437 B1 | 5/2007 |
| EP | 1975091 A2 | 10/2008 |
| EP | 2327644 A1 | 6/2011 |
| EP | 2556000 A2 | 2/2013 |
| EP | 2784006 A1 | 10/2014 |
| WO | 9318445 A1 | 9/1993 |

OTHER PUBLICATIONS

Preliminary Report on Patentability of the International Searching Authority in English from corresponding Patent Cooperation Treaty (PCT) Application No. PCT/IB2016/057798, completed Jul. 5, 2018.

* cited by examiner

FIG. 9

PICK OR PUT STATION WITH CONTROLLABLE RECEPTACLE EXCHANGE

CROSS REFERENCE TO RELATED APPLICATIONS

This application claims priority from U.S. patent application Ser. No. 62/270,636, filed on Dec. 22, 2015, the disclosure of which is hereby incorporated herein by reference.

BACKGROUND OF THE INVENTION

The present invention is directed to a receptacle exchange for a pick or put receptacle and a method for exchanging a pick or put receptacle with a process location at which an operator processes a receptacle by picking articles from or putting articles to a receptacle. While the invention is illustrated for use with a one-to-many pick station, it may also find use with a one-to-one pick/put station. While the invention is illustrated for use with a goods-to-person station, it may also find application, such as with a goods-to-robot station, or the like.

SUMMARY OF THE INVENTION

A receptacle exchange that is adapted to supply and retrieve a receptacle with respect to a process location at which an operator processes the receptacle by picking articles from or putting articles to a receptacle, according to an aspect of the invention, includes a lift that is adapted to elevate a receptacle from a supply location to the process location. An extractor is adapted to retrieve a receptacle from the process location to an extracted location. A first drive moves the lift between the supply location and process location and moves the extractor between the process location and extracted location. A second drive moves an inclination of the extractor. A control controls the first and second drives.

The second drive may travel with the first drive as the first drive moves the extractor, and the second drive may pivot the extractor with respect to the first drive. The second drive may include an arm that extends from the extractor and a linear actuator that is coupled to the arm to pivot the extractor. The linear actuator may be servo motor driven or step motor driven.

The first drive may be a first motor that operates the lift between the supply location and the process location and a second motor that moves the extractor between the process location and the extracted location separate from operation of the first motor. The first drive may be an endless member that commonly drives the lift between the supply location and the process location and the extractor between the process location and extracted location and a reversible drive that reversibly drives the endless member.

The control may separately set the contour of an insertion inclination profile of the extractor as it moves between the extracted location and the process location and the contour of a retraction inclination profile of the extractor as it moves between the process location and the extracted location. The control may select a contour for the insertion inclination profile and/or the retraction inclination profile based upon an external input. The control may select a contour for the retraction inclination profile based on at least one load characteristic of the receptacle being retrieved. The at least one load characteristic may include a position of the overall center of gravity of the receptacle and/or the fragility of the items in the receptacle. The at least one load characteristic may be supplied by a warehouse management system.

The control may select a contour for the insertion inclination profile based on an initial orientation of the extractor at the extracted location. The control may select the initial orientation of the extractor in response to whether a receptacle is present at the supply location.

The extractor may include retraction fingers and the control may adjust the inclination of the extractor at the extracted location to lower the retraction fingers if no receptacle is present at the supply location.

A method for exchanging a pick or put receptacle with a process location at which an operator processes a receptacle by picking articles from or putting articles to a receptacle, according to an aspect of the invention, includes elevating a receptacle with a lift from a supply location to the process location. A receptacle is retrieved with an extractor from the process location to an extracted location. Movement of the lift between the supply location and the process location and movement of the extractor between the process location and the extracted location are controlled. Inclination of the extractor is controlled in coordination with movement of the extractor.

These and other objects, advantages and features of this invention will become apparent upon review of the following specification in conjunction with the drawings.

DESCRIPTION OF THE PREFERRED EMBODIMENT

Figure 1:
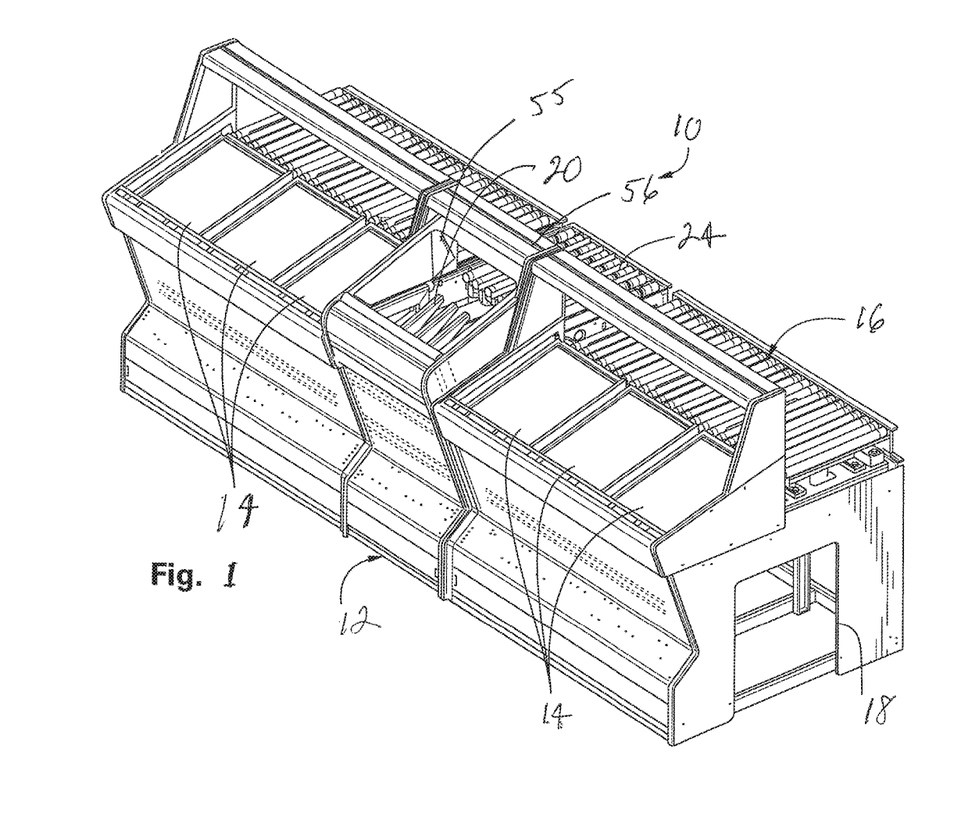
FIG. 1 is a perspective view of a goods-to-person pick station in which a receptacle exchange, according to the embodiments of the invention, is useful.
Figure 2:
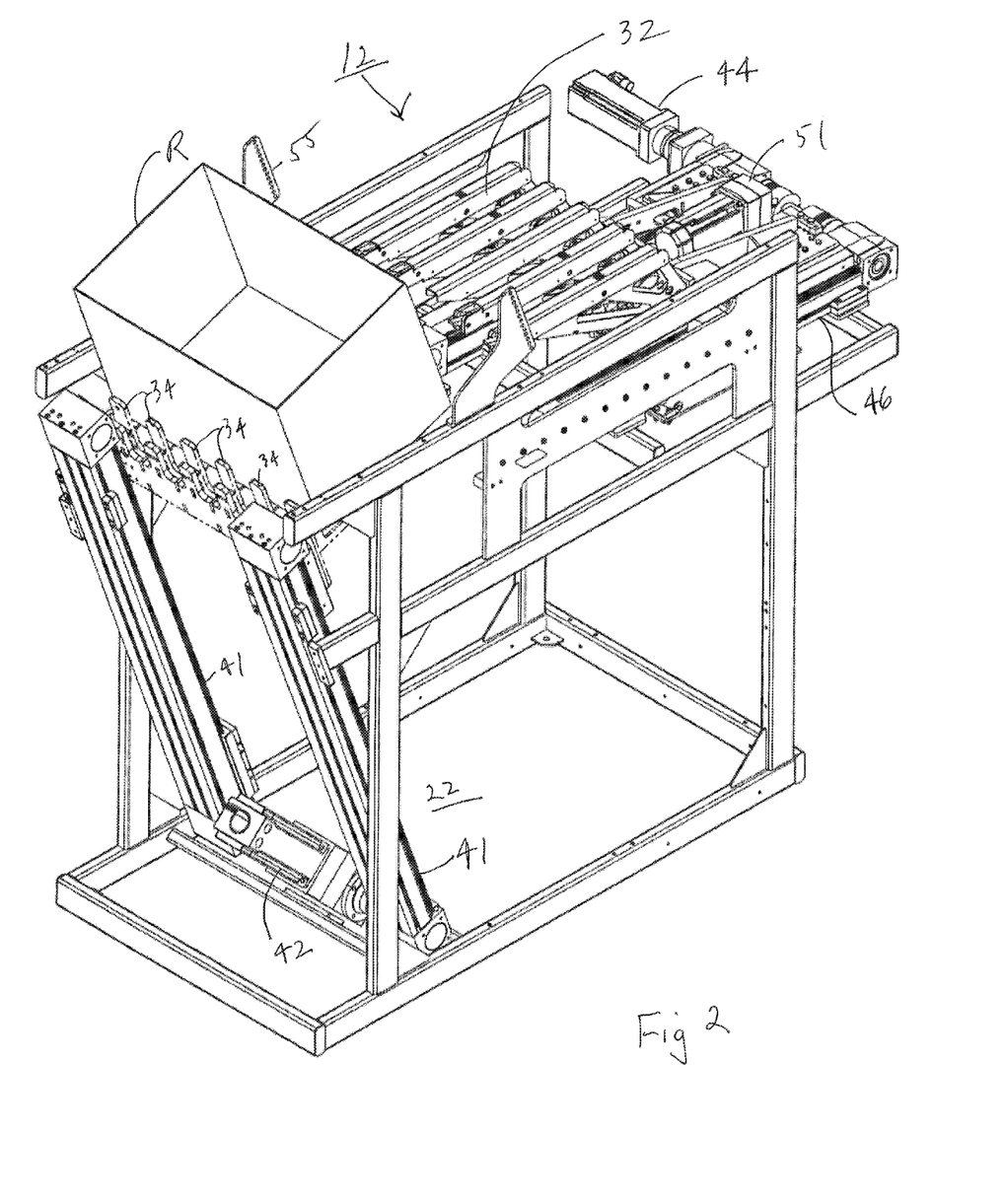
FIG. 2 is a perspective view of a receptacle exchange, according to an embodiment of the invention.

Referring now to the drawings and the illustrative embodiment, a goods-to-person pick station 10 includes a high-speed receptacle exchange 12 and a plurality of put receptacle locations 14 (FIG. 1). Receptacle exchange 12 supplies and retrieves receptacles to a process location 20 at which an operator removes one or more items from the inventory receptacle and distributes the items to one or more order receptacles located at put receptacle locations 14. Inventory receptacles are supplied to station 10 at supply input 18 from an automated warehouse (not shown) to a supply location 24. Inventory receptacles that have been processed are extracted from process location 20 by receptacle exchange 12 to an extracted location 24 on a conveyor 16. Conveyor 16 also takes away order receptacles from put receptacle locations 14 and supplies empty receptacles to put locations 14. Such a goods-to-person pick system is described in detail in commonly assigned U.S. Pat. No. 8,713,899, the disclosure of which is hereby incorporated herein by reference. Such station disclosed in FIG. 1 is known as a 1:6 system since items are picked from one inventory receptacle handled by receptacle exchange 12 and put into up to 6 put receptacles. Receptacle exchange 12 may also be used in a 1:1 system as disclosed in the '899 patent in which two such receptacle exchanges are provided side-by-side, one for handling pick receptacles and one for handling put receptacles. Thus, a receptacle exchange as discussed herein may handle pick or put receptacles. A receptacle R as discussed herein may be a tote, container, pallet, box or other means for holding one or more items. Also, although a goods-to-person pick station is illustrated, the embodiments disclosed herein may also be applied to a goods-to-robot pick station.

Figure 3:
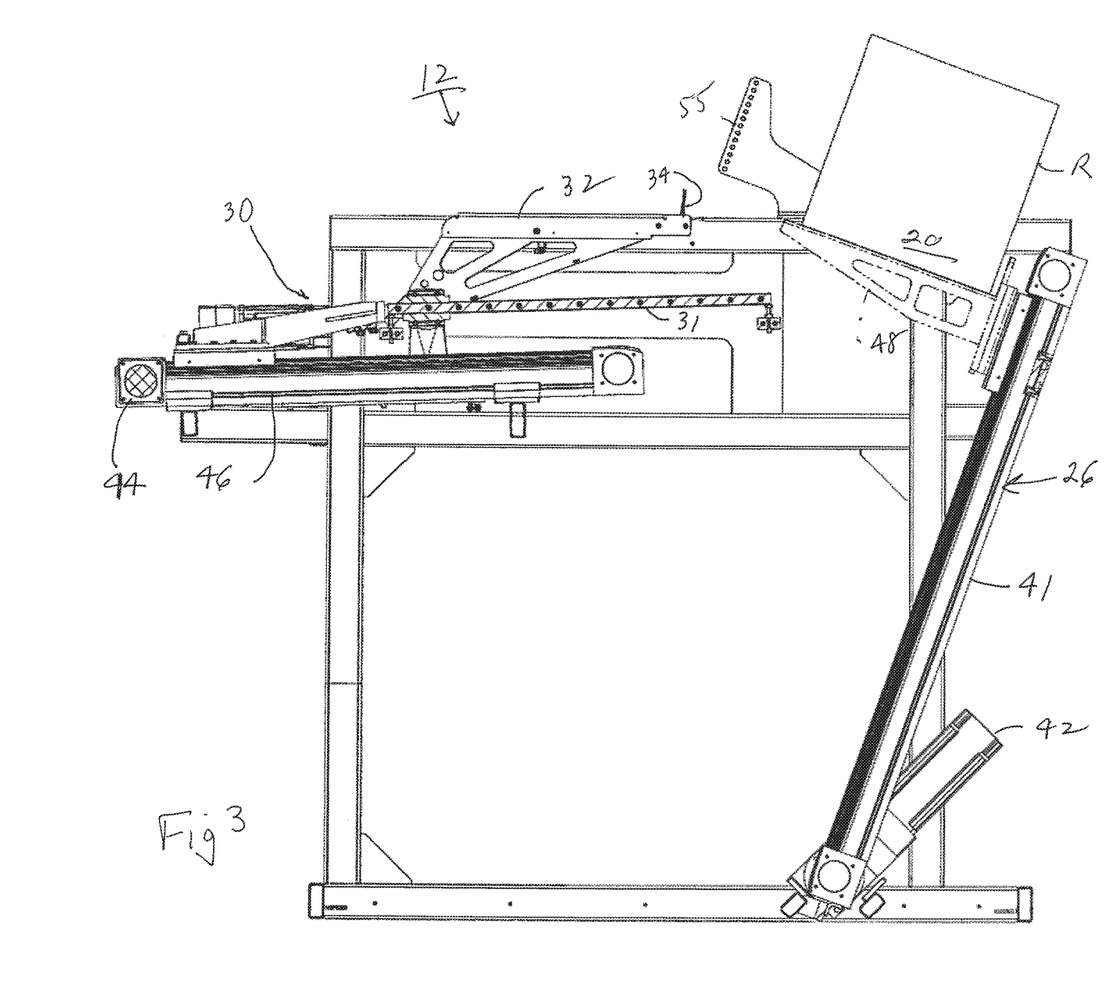
FIG. 3 is a left side elevation view of the receptacle exchange in FIG. 2 showing a receptacle in a process location and the extractor retracted to an extracted location.
Figure 4:
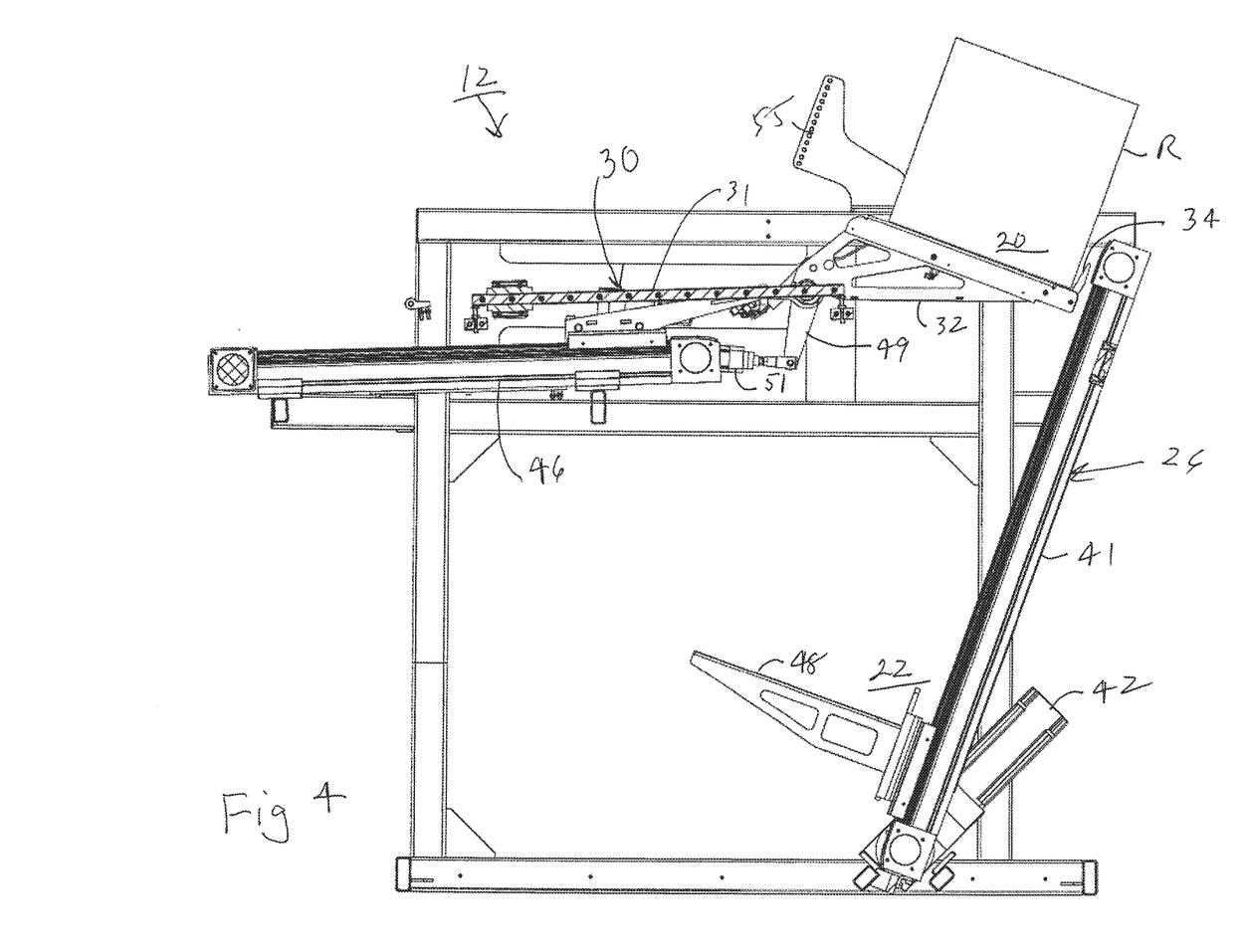
FIG. 4 is the same view as FIG. 3 showing the extractor extended to support a receptacle in the process location while the lift lowers to the receptacle supply location.
Figure 5:
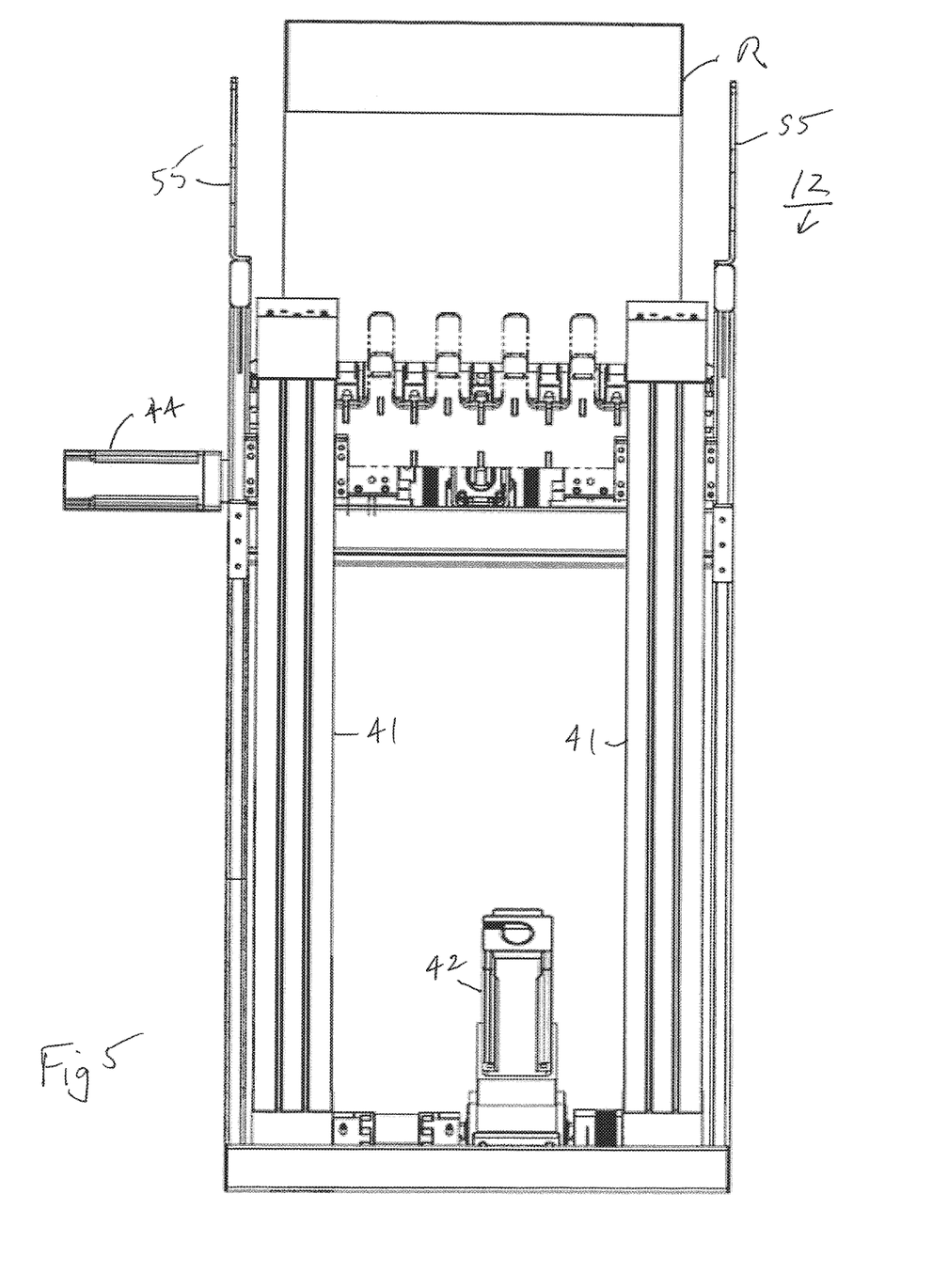
FIG. 5 is a front elevation view of the receptacle exchange in FIG. 2.
Figure 6:
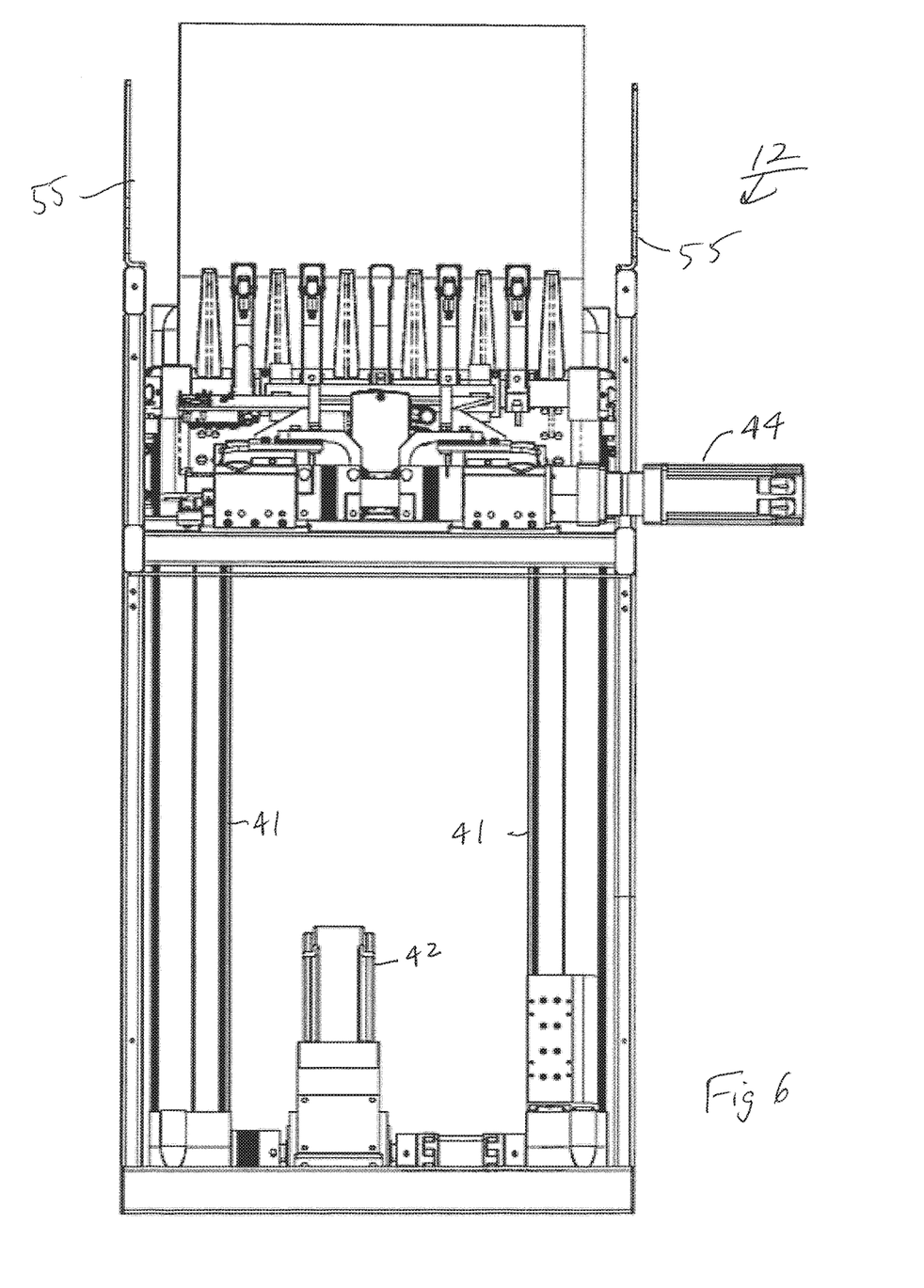
FIG. 6 is a rear elevation view of the receptacle exchange in FIG. 2.

Receptacle exchange 12 includes a lift 26 that elevates a receptacle from supply location 22 to the process location 20 for processing of that receptacle. Lift 26 includes a pair of linear actuators 41 that move a lift platform 28 between supply location 24, as shown in FIG. 4, and process location 20, as shown in FIG. 3. Linear actuators 41 are commonly driven by a lift motor 42, which may be a servo motor, stepper motor, or the like. Receptacle exchange 12 includes an extractor 30 that includes an extractor bed 32 that retrieves a receptacle from process location 20 to extracted location 24 after processing of the receptacle. Also, extractor bed 32 supports the receptacle in process location 20 while the operator is processing that receptacle as lift platform 28 descends to retrieve the next receptacle for processing as illustrated in FIG. 4. Extractor 30 includes a pair of linear actuators 46 that reciprocate extractor bed 32 between process location 20 and extracted location 24 and a linear rail 31 that supports extractor bed 32 while linear actuators extend and retract the extractor bed. Linear actuators 46 are commonly driven by an extension motor 44, which may be a servo motor, a stepper motor, or the like. A pair of safety hood brackets 55 support a safety hood 56 as seen in FIG. 1.

First drive 40 propels lift platform 28 and extractor bed 32. In the illustrated embodiment, first drive 40 is defined by lift motor 42 and extension motor 44 which are independently operated using the principles disclosed in European Patent Publication No. 2,050,695, the disclosure of which is hereby incorporated herein by reference. Alternatively, first drive 40 may include a common, reversible positioning drive that operates the lift platform 28 and extractor bed 32 in unison with an endless belt or other member driven by the drive using the principles disclosed in U.S. Pat. No. 9,026, 243, the disclosure of which is hereby incorporated by reference.

Receptacle exchange 12 includes a second drive 49 that moves an inclination of extractor bed 32 and a control programmed with a control program 53 that controls the first and second drives. Control program 53 controls first drive 40 in the same manner as disclosed in the US '899 and EP '695 patents, so it will not be described further in detail. However, control program 53 controls second drive 47 independently of first drive 40, but in coordination with control of the first drive, as will be discussed in more detail below.

Second drive 47 travels with first drive 40 as the first drive moves extractor bed 32 and pivots extractor bed 32 with respect to first drive 40. In particular, second drive 47 travels with linear actuator 46 as extension servo 44 causes it to extend extractor bed 32 to the process location 20 and as linear actuator 46 retracts the extractor bed to the extracted location 24. Since second drive 47 travels with linear actuator 46 and is capable of pivoting extractor bed 32 independently of extractor extension servo 44, control program 53 is capable of carrying out a programmed tilt profile of extractor bed 32 as it travels between process location 20 and extracted location 24. Also, the programmed tilt profile can be different for extension of the extractor as it travels to the process location 20 from the extracted location from a retracted tilt profile of extractor bed 32 as it travels between the process location 20 and extracted location 24. Second drive 47 includes an arm 49 fixedly connected with extractor bed 32 at a general location where extractor bed 32 is pivotally joined with linear actuator 36 and a linear actuator 51 that is coupled to linear actuator 46 and arm 49. In this manner, the extension and retraction of linear actuator 46 causes pivoting or rotation of extractor bed 32. Since linear actuator 46 is mounted to travel with linear actuator 46, the inclination of extractor bed 32 can be changed according to the extracted position of the extractor bed. Linear actuator 51 is driven by a servo motor or a stepper motor.

Figure 7A:
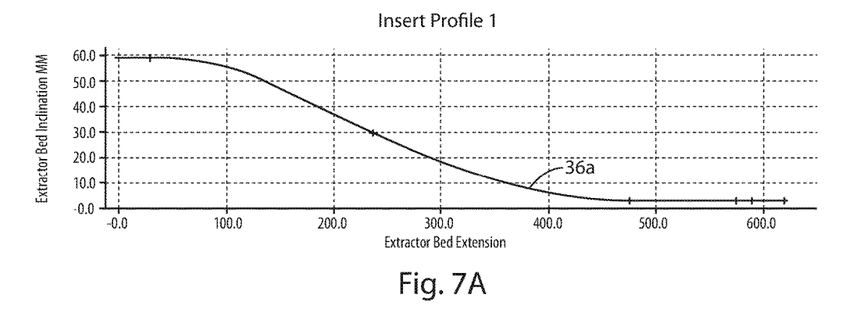
FIG. 7A is a chart of an insert program relating inclination of the extractor in mm to the position of the extractor from the retracted position at the left of the chart to the extended position to the control location at the right of the chart for one starting inclination of the extractor.
Figure 7B:
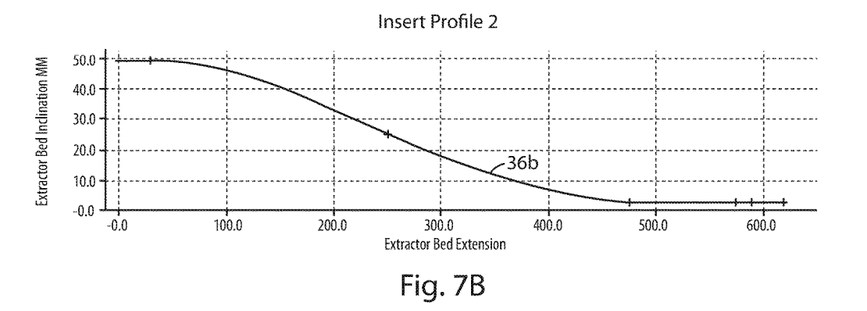
FIG. 7B is the same view as FIG. 7A for a different starting inclination of the extractor.
Figure 8:
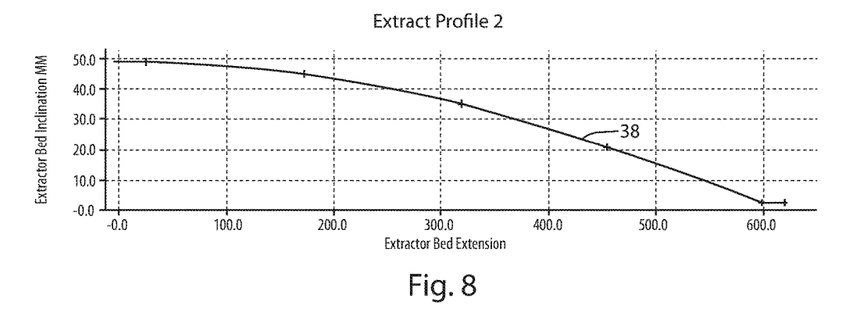
FIG. 8 is a chart of an extract program relating inclination of the extractor in mm to the position of the extractor from the control location at the right of the chart to the extracted position at the left of the chart.

Control program 53 sets the contour of an extension inclination profile 36a, 36b of extractor bed 32 shown in FIGS. 7A and 7B as it moves between the extracted location 24 and process location 20 and contour of a retraction inclination profile 38 of extractor bed 32 shown in FIG. 8 as extractor bed 32 moves between the process location 20 and extracted location 24. Control program 53 may be set to different contours of insertion inclination profile 36a, 36b as a function of other parameters, such as starting tilt value. For example, the control may set inclination profile 36a shown in FIG. 7A for one starting tilt value and inclination profile 36b shown in FIG. 7B for a different starting tilt value. Control program 53 may set the contour of retraction inclination profile 38 shown in FIG. 8 based on at least one load characteristic of the receptacle R being retracted. The at least one load characteristic may include a position of the overall center of gravity of the receptacle established by the type and number of items in the receptacle. Thus, where the center of gravity is low, the inclination of the extractor bed may increase at a rapid rate during retraction without fear of toppling the receptacle. Conversely, where the overall center of gravity of the receptacle is high and/or close to the portion of the receptacle furthest from the extracted location, the control may use an inclination profile contour that rotates the receptacle to horizontal before retracting the receptacle to avoid toppling of the receptacle. Also, if the content of the receptacle includes fragile loads subject to being crushed, the retraction rate of the extractor bed may be set to a slower rate by first drive 40 in order to reduce horizontal forces on the load. The load characteristic is supplied by a warehouse management system (not shown) which controls overall operation of GTP station 10. The warehouse management system maintains information on each of the receptacles in the system, including the content thereof. Since it directs which receptacle is being presented to the operator for processing and how many items are to be picked, it has knowledge of the content of the receptacle being extracted from process location 20 for setting the contour of second inclination profile 38.

Extractor 32 includes retraction fingers 34 that prevent the receptacle R from sliding off the bed as the receptacle is being retracted. In the prior art, such fingers were pneumatically pivoted upward and downward as necessary thus resulting in a need for a pneumatic supply to the GTP station. In the illustrated embodiment, retraction fingers 34 are fixedly attached to extractor bed 32. Control program 53 adjusts inclination of the extractor at the extracted location to lower the retraction fingers, when necessary, to prevent the fingers 34 from extending above conveyor 16 if a receptacle may be travelling along conveyor 16 while the fingers are in a raised inclination where the travelling receptacle could come into contact with the fingers 34 as will be discussed below. The control sets a first inclination profile 36a if the inclination of the extractor bed at the extracted location 24 is elevated as shown in FIG. 7A and sets a different inclination profile 36b if the extractor bed is at a retracted inclination as shown in FIG. 7B.

Thus, receptacle exchange 12 goes through a process under control program 53 for exchanging a pick or put receptacle with a process location at which an operator processes a receptacle by picking articles from or putting articles to a receptacle by elevating a receptacle with lift 26 from a supply location 22 to the process location 20 for processing of that receptacle. When the operator indicates that the receptacle has been fully processed, such as by pressing a button, or the like, the receptacle is extracted with extractor 30 from the process location 20 to extracted location 24. Movement of lift 26 between the supply location 22 and the process location 20 and extension of the extractor between the process location and the extracted location is effected by first drive 40. Inclination of extractor 30 is controlled with a separately controllable second drive 47 according to a program in coordination with movement of the extractor.

Figure 9:
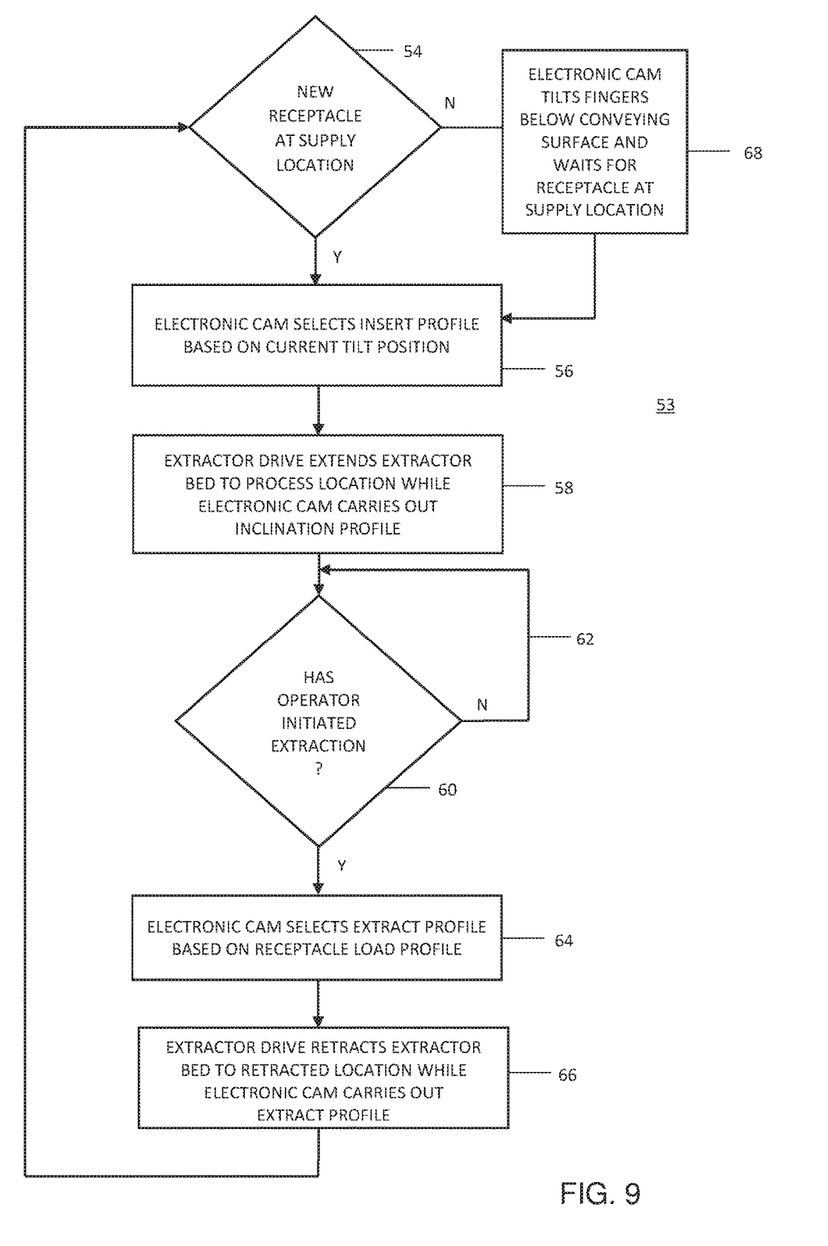
FIG. 9 is a flowchart of a control program for the extractor.

Referring to FIG. 9, control program 53 operates in a cyclical fashion so there is no starting or ending point. Arbitrarily starting at 60 where receptacle exchange 12 is paused with a receptacle in a process location for picking or putting by the operator, the control program is in a delay loop 62 waiting for the operator to indicate that the processing of that receptacle is complete. Then the control sets a contour of extract profile 38 based on the load profile of the receptacle at 64 and causes at 66 the first drive 40 to retract the extractor bed to the extracted location 24 and second drive 47 to control inclination of extractor bed 32 according to extract profile 38. With the extractor bed 32 at the extracted location 24 on conveyor 16, the control program determines at 54 whether a receptacle is present at supply location 22, such as by a known type of sensor. If it is determined at 54 that there is a new receptacle waiting at the supply location, lift 26 will be elevating the receptacle to process location 20. The control program then selects insertion inclination profile 36a at 56 since the extractor was extended immediately so it will start from a higher inclination. First drive 40 then extends extractor bed 32 to the process location 20 while second drive 47 carries out inclination profile at 58. When the extractor bed 32 is at the process location, it will support the new receptacle while the control program awaits an indication at 60 that the operator has completed the pick or put process.

If it is determined at 54 that there is not a new receptacle at supply location 22, lift 26 will wait with lift platform 28 at supply location 22 until a new receptacle comes along for lift platform 28 to elevate and extractor bed 32 will wait at the extracted location 24 for the lift platform to elevate the new receptacle to the process location 20. Since such delay is of indefinite duration, there is a risk that another receptacle may travel along conveyor 16 past receptacle exchange 12. Therefore, there would be a risk that the receptacle may contact extractor fingers 34 if they get stuck above the conveying surface of conveyor 16. If it is determined at 54 that there is not a new receptacle at supply location 22, the electronic cam will rotate the extractor bed to an inclination that will position the extractor fingers 34 below the conveying surface of conveyor 16. Thus, in this retracted position, there is no risk to a receptacle travelling along conveyor 16 from engaging fingers 34. With the change in inclination of the extractor bed at 68, the control will set at 56 extension profile 36b to adapt to the lower initial inclination of the extractor bed.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A receptacle exchange that is adapted to supply and retrieve a receptacle with respect to a process location at which an operator processes the receptacle by picking articles from or putting articles to a receptacle, said receptacle exchange comprising:
   a lift that is adapted to elevate a receptacle from a supply location to the process location;
   an extractor that is adapted to retrieve a receptacle from the process location to an extracted location;
   a first drive that moves said lift between the supply location and the process location and that moves said extractor between the process location and the extracted location;
   a second drive that moves an inclination of said extractor; and
   a control, said control controlling said first and second drives, wherein said control is adapted to separately set a contour of an insertion inclination profile of said extractor as it moves between the extracted location and the process location and the contour of a retraction inclination profile of said extractor as it moves between the process location and the extracted location.

2. The receptacle exchange as claimed in claim 1 wherein said second drive travels with said first drive as said first drive moves said extractor and said second drive pivots said extractor with respect to said first drive.

3. The receptacle exchange as claimed in claim 2 including an arm that extends from said extractor and wherein second drive comprises a linear actuator that is coupled to said arm to pivot said extractor.

4. The receptacle exchange as claimed in claim 3 wherein said linear actuator is servo motor driven or step motor driven.

5. The receptacle exchange as claimed in claim 1 wherein said first drive comprises a first motor that operates said lift between the supply location and the process location and a second motor that operates said extractor between the process location and the extracted location separate from operation of said first motor.

6. The receptacle exchange as claimed in claim 1 wherein said first drive comprises an endless member that commonly drives said lift between the supply location and the process location and said extractor between the process location and the extracted location and a reversible drive that reversibly drives said endless member.

7. The receptacle exchange as claimed in claim 1 wherein said control is adapted to set a contour for at least one chosen from the insertion inclination profile and the retraction inclination profile based upon an external input.

8. The receptacle exchange as claimed in claim 7 wherein the control is adapted to set a contour for the retraction inclination profile based on at least one load characteristic of the receptacle.

9. The receptacle exchange as claimed in claim 8 wherein the at least one load characteristic includes a position of the overall center of gravity of the receptacle.

10. The receptacle exchange as claimed in claim 8 wherein the at least one load characteristic includes fragility of the items in the receptacle.

11. The receptacle exchange as claimed in claim 8 wherein the at least one load characteristic is supplied by a warehouse management system.

12. The receptacle exchange as claimed in claim 7 wherein the control is adapted to set a contour for the insertion inclination profile based on an initial orientation of said extractor at the extracted location.

13. The receptacle exchange as claimed in claim 12 wherein the control is adapted to set the initial orientation of said extractor at the extracted location in response to whether a receptacle is present at the supply location.

14. The receptacle exchange as claimed in claim 13 wherein the extractor includes retraction fingers and wherein the control adjusts the inclination of the extractor at the extracted location to lower the retraction fingers if no receptacle is present at the supply location.

15. A method for exchanging a receptacle with a process location at which an operator processes a receptacle by picking articles from or putting articles to a receptacle, said method comprising:
 elevating a receptacle with a lift from a supply location to the process location;
 retrieving a receptacle with an extractor from the process location to an extracted location;
 controlling movement of the lift between the supply location and the process location and movement of the extractor between the process location; and
 controlling inclination of the extractor in coordination with movement of the extractor, including separately setting a contour of an insertion inclination profile of said extractor as it moves between the extracted location and the process location and the contour of a retraction inclination profile of said extractor as it moves between the process location and the extracted location.

16. The method as claimed in claim 15 including setting a contour for at least one chosen from the insertion inclination profile and the retraction inclination profile based upon an external input.

17. The method as claimed in claim 16 including setting a contour for the retraction inclination profile based on at least one load characteristic of the receptacle.

18. The method as claimed in claim 17 wherein the at least one load characteristic includes a position of the overall center of gravity of the receptacle.

19. The method as claimed in claim 17 wherein the at least one load characteristic includes fragility of the items in the receptacle.

20. The method as claimed in claim 17 wherein the at least one load characteristic is supplied by a warehouse management system.

21. The method as claimed in claim 16 including setting a contour for the insertion inclination profile based on an initial orientation of said extractor at the extracted location.

22. The method as claimed in claim 21 wherein the control selects the initial orientation of said extractor at the extracted location in response to whether a receptacle is present at the supply location.

* * * * *